US 8,161,509 B2

(12) United States Patent
Takatori

(10) Patent No.: US 8,161,509 B2
(45) Date of Patent: Apr. 17, 2012

(54) TELEVISION RECEIVER AND METHOD FOR PROVIDING INFORMATION TO THE SAME

(75) Inventor: Masahiro Takatori, Toyonaka (JP)

(73) Assignee: Panasonic Corporation, Osaka (JP)

( * ) Notice: Subject to any disclaimer, the term of this patent is extended or adjusted under 35 U.S.C. 154(b) by 1446 days.

(21) Appl. No.: 10/344,569

(22) PCT Filed: Jun. 7, 2002

(86) PCT No.: PCT/JP02/05644
§ 371 (c)(1),
(2), (4) Date: Feb. 13, 2003

(87) PCT Pub. No.: WO02/002064
PCT Pub. Date: Dec. 19, 2002

(65) Prior Publication Data
US 2003/0172385 A1 Sep. 11, 2003

(30) Foreign Application Priority Data
Jun. 11, 2001 (JP) ................................ 2001-175143

(51) Int. Cl.
*H04N 7/10* (2006.01)
*H04N 7/025* (2006.01)
*H04N 7/173* (2006.01)
(52) U.S. Cl. .......................... 725/36; 725/32; 725/113
(58) Field of Classification Search .................. 725/32, 725/36, 113
See application file for complete search history.

(56) References Cited

U.S. PATENT DOCUMENTS

| 5,929,849 | A * | 7/1999 | Kikinis .......................... 725/113 |
| 6,154,205 | A * | 11/2000 | Carroll et al. .................. 345/684 |
| 6,240,555 | B1 * | 5/2001 | Shoff et al. .................... 725/110 |
| 6,266,814 | B1 * | 7/2001 | Lemmons et al. ............... 725/44 |
| 6,285,407 | B1 | 9/2001 | Yasuki et al. |
| 6,308,327 | B1 * | 10/2001 | Liu et al. ........................ 725/37 |
| 6,421,067 | B1 * | 7/2002 | Kamen et al. ................. 715/719 |
| 6,442,755 | B1 * | 8/2002 | Lemmons et al. ............... 725/47 |
| 6,539,545 | B1 * | 3/2003 | Dureau et al. .................. 725/48 |
| 6,571,392 | B1 * | 5/2003 | Zigmond et al. ............... 725/110 |
| 6,785,902 | B1 * | 8/2004 | Zigmond et al. ............... 725/38 |

(Continued)

FOREIGN PATENT DOCUMENTS

EP 1 063 597 12/2000

(Continued)

*Primary Examiner* — Brian Pendleton
*Assistant Examiner* — Jonathan V Lewis
(74) *Attorney, Agent, or Firm* — Wenderoth, Lind & Ponack, L.L.P.

(57) ABSTRACT

A television broadcasting device 1 transmits a television signal onto which control data for controlling a browser function of a television receiver 2 has been multiplexed. A television screen generating section 20 generates a television screen based on the received television signal. A browser display instruction obtaining section 71, a URL obtaining section 72, and a display style information obtaining section 73 extract the control data multiplexed onto the television signal. When a browser display instruction 111 is received, a microcomputer 51 receives a content 102 corresponding to a URL 112 from a server 3, and generates a browser screen based thereon. A screen combining section 30 combines the browser screen with the television screen in accordance with display style information 113 received from the microcomputer 51. Thus, it is possible to display the browser screen in a combined form with the television screen in accordance with a display style designated by a broadcaster of the television signal.

14 Claims, 13 Drawing Sheets

U.S. PATENT DOCUMENTS

| | | | |
|---|---|---|---|
| 6,829,780 B2 * | 12/2004 | Kraft et al. | 725/42 |
| 6,938,270 B2 * | 8/2005 | Blackketter et al. | 725/112 |
| 6,978,473 B1 * | 12/2005 | Nsonwu et al. | 725/52 |
| 6,993,722 B1 * | 1/2006 | Greer et al. | 715/739 |
| 7,051,351 B2 * | 5/2006 | Goldman et al. | 725/34 |
| 7,103,904 B1 * | 9/2006 | Blackketter et al. | 725/32 |
| 7,143,428 B1 * | 11/2006 | Bruck et al. | 725/37 |
| 7,996,873 B1 * | 8/2011 | Nathan et al. | 725/91 |
| 7,996,878 B1 * | 8/2011 | Basso et al. | 725/135 |
| 2002/0056083 A1 * | 5/2002 | Istvan | 725/1 |
| 2002/0066101 A1 * | 5/2002 | Gordon et al. | 725/43 |
| 2002/0069411 A1 * | 6/2002 | Rainville et al. | 725/37 |
| 2002/0124255 A1 * | 9/2002 | Reichardt et al. | 725/42 |
| 2002/0129374 A1 * | 9/2002 | Freeman et al. | 725/91 |
| 2002/0184634 A1 * | 12/2002 | Cooper | 725/51 |
| 2006/0130109 A1 * | 6/2006 | Zenith | 725/110 |

FOREIGN PATENT DOCUMENTS

| | | |
|---|---|---|
| JP | 10-032798 | 2/1998 |
| JP | 10-126354 | 5/1998 |
| JP | 10-174007 | 6/1998 |
| JP | 11-146362 | 5/1999 |
| JP | 11-510978 | 9/1999 |
| JP | 2000-165829 | 6/2000 |
| WO | 97/41690 | 11/1997 |
| WO | 99/29109 | 6/1999 |

* cited by examiner

FIG. 11
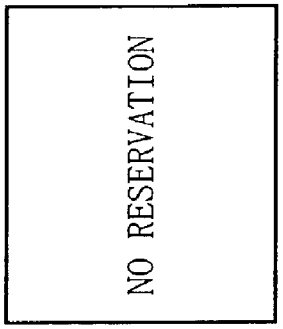
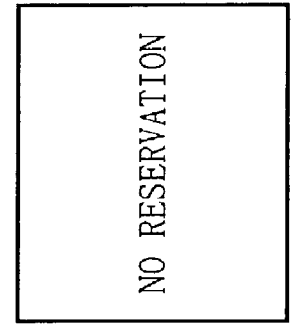
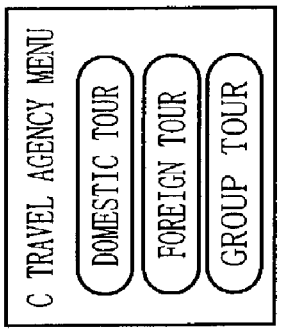
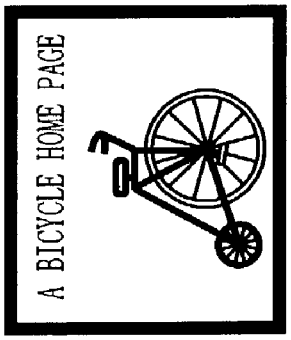
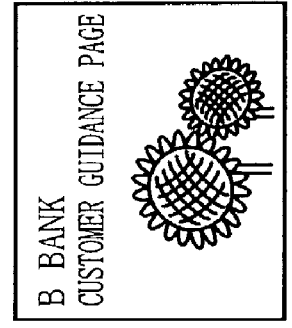

TELEVISION RECEIVER AND METHOD FOR PROVIDING INFORMATION TO THE SAME

TECHNICAL FIELD

The present invention relates to a device having a function of receiving a television broadcast and a method for providing information to the same. The device targeted by the present invention includes, for example, a stationary television system, a portable television device, a set-top box, and a personal computer incorporating a function of receiving a television broadcast, or the like.

BACKGROUND ART

In recent years, with the progress of digitization of television broadcast, communications circuits have increased in capacity. Furthermore, broadcasting technology and communications technology have united, and various devices provided with both broadcasting and communications functions have been developed. A typical example of such devices is a television receiver provided with a WWW (World Wide Web) browser function.

Conventionally, the following technology has been known with regard to the television receiver provided with the WWW browser function. FIG. 12 is a block diagram illustrating the structure of a conventional television broadcasting device and a conventional television receiver. In FIG. 12, a multiplexing section 19 of the television broadcasting device 8 multiplexes a URL display instruction 119 and a URL (Uniform Resource Locator) 112 onto an inputted television signal 101. A transmitting section 12 transmits, to a television receiver 9, the television signal outputted from the multiplexing section 19.

A television screen generating section 20 of the television receiver 9 receives the television signal transmitted from the television broadcasting device 8, and generates a television screen based thereon. Furthermore, the television screen generating section 20 applies a filtering process to the received television signal, and outputs a control stream obtained by this process to a control microcomputer (hereinafter referred to as a microcomputer for short) 59. Such processes performed in the television screen generating section 20 are widely known as an indispensable process for a digital television receiver.

A URL display instruction obtaining section 79 extracts, from the control stream outputted from the television screen generating section 20, the URL display instruction 119 multiplexed in the television broadcasting device 8. Similarly, a URL obtaining section 72 extracts, from the control stream, the URL 112 multiplexed in the television broadcasting device 8.

The microcomputer 59 performs various control processes in the television receiver 9. When the URL display instruction 119 is received from the URL display instruction obtaining section 79, the microcomputer 59 performs on-screen display control (hereinafter referred to as OSD control for short) for displaying the URL 112 obtained by the URL obtaining section 72 on a screen. If a user uses a remote controller 80 to activate a browser when the URL is being displayed on the screen, the microcomputer 59 starts a WWW browser process. More specifically, as a first step, the microcomputer 59 receives, from a server 3 connected to the Internet 4, a content 102 corresponding to the URL 112 obtained by the URL obtaining section 72 by controlling a modem 90 for performing a communications protocol process. Then, as a second step, the microcomputer 59 generates a browser screen based on the received content.

A screen combining section 39 obtains a screen to be displayed on a monitor 40, based on the television screen generated by the television screen generating section 20 and the browser screen generated as a result of the WWW browser process performed by the microcomputer 59. The screen combining section 39 selects either the television screen or the browser screen for output in accordance with a control by the microcomputer 59. Alternatively, the screen combining section 39 uses a fixed scaling section 38 for fixedly reducing the size of the browser screen in order to obtain a display screen including both the television screen and the browser screen. In both cases, processes performed by the screen combining section 39 are fixedly determined in the television receiver 9.

Hereinafter, a method for providing an advertisement to the television receiver 9 and an operation of the television receiver 9 are described by taking, as an example, a case where a commercial message for a product a which is manufactured and distributed by a company A is broadcast. It is assumed that the company A administers the server 3 connected to the Internet 4, and that the content 102 introducing the product a has been stored in the server 3. A television program producer desires a user (viewer) of the television receiver 9 to access the content 102 when the commercial message for the product a is broadcast. Therefore, the television broadcasting device 8 multiplexes the URL display instruction 119 and the URL 112 of the content 102 onto the inputted television signal 101 for transmission.

FIG. 13 is a flowchart illustrating an operation of the microcomputer 59 at the time of receipt of the television broadcast. It is assumed that a television program is displayed on the monitor 40 of the television receiver 9 in the initial state before the commercial message is received. When the television broadcast changes into the commercial message for the product a, the television broadcasting device 8 multiplexes the URL display instruction 119 and the URL 112 of the content 102 onto the inputted television signal 101 for transmission. With reference to FIG. 13, described below is an operation of the microcomputer 59 after the television receiver 9 receives the television signal onto which these two types of data have been multiplexed.

First, the microcomputer 59 obtains the URL display instruction 119 and the URL 112 from the URL display instruction obtaining section 79 and the URL obtaining section 72, respectively (step S901). Next, the microcomputer 59 performs OSD control in order to display the obtained URL 112 on the screen (step S902). Hereupon, the obtained URL 112 is displayed on the monitor 40 in a combined form with the television screen, thereby enabling the viewer to recognize the presence of the content 102 related to the product a. If the viewer becomes interested in the product a, he/she uses the remote controller 80 for inputting a browser activate command into the television receiver 9. On the other hand, if the viewer does not become interested in the product a, he/she uses the remote controller 80 for inputting a URL clear command into the television receiver 9. After checking an input from the remote controller 80, the microcomputer 59 proceeds to step S904 if the browser activate command is inputted, or proceeds to step S908 if the URL clear command is inputted (step S903).

If the browser activate command is inputted, the microcomputer 59 receives, from the server 3 connected to the Internet 4, the content 102 corresponding to the obtained URL 112 (step S904). Then, the microcomputer 59 instructs the screen combining section 39 to do a full-screen display in order to display the received content in a full-screen on the monitor 40 (step S905). Next, the microcomputer 59 generates the browser screen based on the received content (step S906). The browser screen generated by the microcomputer 59 is provided to the screen combining section 39, and memorized in a display plane (not shown) managed by the screen combining section 39. Having received, at step S905, the instruction to do the full-screen display, the screen combining section 39 outputs the browser screen provided from the microcomputer 59 as it is. Thus, the browser screen is displayed in a full-screen on the monitor 40.

Next, the microcomputer 59 performs the WWW browser process (step S907). While control of the microcomputer 59 is at step S907, the viewer is allowed to use the television receiver 9 as a WWW browser. If a browser end command is inputted while performing the WWW browser process, the microcomputer 59 ends the WWW browser process, and thereby ends the process for the URL display instruction 119.

Furthermore, if the URL clear command is inputted at step S903, the microcomputer 59 performs OSD control in order to clear the displayed URL. In this case, the microcomputer 59 ends the process for the obtained URL display instruction 119 without performing the WWW browser process.

However, the above-described conventional television receiver has the following problems. First, a display style of the browser screen is fixedly determined in the television receiver, which makes it impossible for the conventional television receiver to display the browser screen in accordance with the display style designated by a sender of the television broadcast. Furthermore, the WWW browser is activated based on the command inputted by the viewer, thereby preventing the conventional television receiver from displaying the browser screen in synchronization with the television broadcast. Still further, a display style of the browser screen is fixedly determined in the television receiver, whereby a main part of the television screen may be defaced by the browser screen in the conventional television receiver. For example, an advertised item may be hidden under the browser screen when the commercial message is broadcast.

Therefore, an object of the present invention is to provide a television receiver and a method for providing information thereto, which can solve the above-described problems of the conventional television receiving device.

DISCLOSURE OF THE INVENTION

To achieve the above objects, the present invention has the following aspects.

A first aspect of the present invention is directed to a television receiver that receives a television broadcast, including: a television screen generating section for receiving a television signal and generating a television screen based on the received television signal; a content receiving section for receiving a content from a server connected via a communications network; a browser screen generating section for generating a browser screen based on the content received by the content receiving section; a display style information obtaining section for obtaining, from the television signal, display style information that determines a display style of the browser screen; and a screen combining section for combining the browser screen with the television screen in accordance with the display style information obtained by the display style information obtaining section.

According to the first aspect, the television receiver receives the television signal including the display style information, and displays the browser screen in a combined form with the television screen in accordance with the received display style information. Thus, it is possible to display the browser screen in a combined form with the television screen in accordance with the display style designated by a broadcaster of the television signal.

In a second aspect of the present invention based on the first aspect, the display style information at least includes information about a rectangular area placed where the browser screen is to be combined with the television screen, and the screen combining section changes a size of the browser screen corresponding to a size of the rectangular area and combines the resized browser screen with the television screen.

In this case, the display style information may include, as information about the rectangular area, a position of one vertex of the rectangular area and lengths of two sides of the rectangular area on the television screen, or include positions of two vertices of the rectangular area on the television screen.

According to the second aspect, by including the information about the rectangular area in the display style information, the television receiver can display the browser screen in a combined form in accordance with a position and size designated by the broadcaster of the television signal.

In a third aspect of the present invention based on the first aspect, the display style information is determined based on a structure of the television screen.

According to the third aspect, the display style of the browser screen is determined based on the structure of the television screen. Thus, it is possible to determine the display style of the browser screen so as not to deface a main part of the television screen. For example, it is possible to determine the display style of the browser screen so that an advertised item is not hidden under the browser screen when the commercial message is broadcast.

In a fourth aspect of the present invention based on the first aspect, the browser screen is a screen related to the television screen.

According to the fourth aspect, by displaying the browser screen related to the television screen in a combined form with the television screen, it is possible to concurrently provide a viewer with information related to the television screen.

In this case, the browser screen may be a screen related to the advertised item appearing on the television screen. Thus, by displaying such a content (a content introducing the advertised item, or a content administered by a business enterprise providing the advertised item to the viewer) related to the advertised item appearing on the television screen in a combined form with the television screen, it is possible to provide the viewer with advertising information effectively.

In a fifth aspect of the present invention based on the first aspect, a content identification information obtaining section for obtaining, from the television signal, content identification information for identifying the content stored in the server is further provided, and the content receiving section receives the content corresponding to the content identification information obtained by the content identification information obtaining section.

According to the fifth aspect, the television signal includes the content identification information, and the television receiver obtains the content by using the received content identification information and generates the browser screen based on the obtained content. Thus, the sender of the television signal is allowed to change freely the browser screen displayed on the television receiver.

In this case, a display instruction obtaining section for obtaining a content display instruction from the television signal may be further provided, and the content receiving section and the browser screen generating section may operate when the display instruction obtaining section obtains the display instruction. As such, the television receiver starts a WWW browser process immediately after receipt of the browser display instruction. Thus, the sender of the television signal is allowed to control the timing for displaying the browser screen on the television screen, thereby enabling the browser screen to be displayed with ease in synchronization with the television broadcast.

In a sixth aspect of the present invention based on the first aspect, an inputting section operated by a user is further provided, and the screen combining section changes a size of the browser screen when a size change command is inputted from the inputting section.

According to the sixth aspect, the size of the browser screen is set by the user. Thus, it is possible to display the browser screen that has been resized to the size desired by the user in a combined form with the television screen.

In a seventh aspect of the present invention based on the first aspect, an inputting section operated by a user and a content storing section for storing the content received by the content receiving section when a reserve command is inputted from the inputting section are further provided, and the browser screen generating section generates the browser screen based on the content stored in the content storing section when a display command is inputted from the inputting section.

According to the seventh aspect, the received content is stored when the reserve command is inputted, and the browser screen is generated based on the stored content when the display command is inputted. Thus, it is possible to display the reserved content without reaccessing the server.

In this case, a content identification information obtaining section for obtaining, from the television signal, content identification information for identifying the content stored in the server, and a content identification information storing section for storing the content identification information obtained by the content identification information obtaining section may be further provided, and the content receiving section may receive, from the server, the content specified by an update display command by using the content identification information stored in the content identification information storing section when the update display command is inputted from the inputting section. Thus, the obtained content identification information is stored when the reserve command is inputted. Thus, it is possible to access any previously accessed content without obtaining the content identification information again.

Furthermore, when a reserved substance display command is inputted from the inputting section, the browser screen generating section may generate a content listing screen based on the content stored in the content storing section. Thus, by displaying any contents stored at the time of reservation in list form, the user can recognize easily which contents he/she has reserved.

Still further, the content receiving section may receive, when a refer link command is inputted from the inputting section, the content specified by the refer link command based on the content stored in the content storing section. Thus, by accessing a link based on the content stored at the time of reservation, it is possible to access the content represented by the link without newly obtaining the content identification information of the link.

In an eighth aspect of the present invention based on the first aspect, a display section for displaying the screen obtained by the screen combining section is further provided.

A ninth aspect of the present invention is directed to a method for providing information to a television receiver, the method being executed when a content related to a television screen has been stored in a server connected to a communications network, the method including: a television signal inputting step of inputting a television signal corresponding to the television screen; a display style information inputting step of inputting display style information that determines a display style of a browser screen, the display style being used when the browser screen generated based on the content is combined with the television screen; a multiplexing step of multiplexing the display style information onto the television signal; and a television signal transmitting step of transmitting, to the television receiver, the television signal onto which the display style information has been multiplexed.

According to the ninth aspect, when transmitting the television signal, the television signal including the display style information is transmitted. The television receiver that has received the television signal displays the browser screen in a combined form with the television screen in accordance with the received display style information. Thus, it is possible to display the browser screen in a combined form with the television screen in accordance with the display style designated by the sender of the television signal.

In a tenth aspect of the present invention based on the ninth aspect, the display style information at least includes information about a rectangular area placed where the browser screen is to be combined with the television screen.

According to the tenth aspect, by including the information about the rectangular area in the display style information, the television receiver can display the browser screen in a combined form on a position designated by the broadcaster of the television signal.

In an eleventh aspect of the present invention based on the ninth aspect, the display style information is determined based on a structure of the television screen.

According to the eleventh aspect, the display style of the browser screen is determined based on the structure of the television screen, whereby it is possible to determine the display style of the browser screen so as not to deface a main part of the television screen. For example, it is possible to determine the display style of the browser screen so that an advertised item is not hidden under the browser screen when a commercial message is broadcast.

In a twelfth aspect of the present invention based on the ninth aspect, the browser screen is a screen related to the television screen.

According to the twelfth aspect, by displaying the browser screen related to the television screen in a combined form with the television screen, it is possible to concurrently provide a viewer with information related to the television screen.

In this case, the browser screen may be a screen related to the advertised item appearing on the television screen. Thus, by displaying such a content (a content introducing the advertised item, or a content administered by a business enterprise providing the advertised item to the viewer) related to the advertised item appearing on the television screen in a combined form with the television screen, it is possible to provide the viewer with advertising information effectively.

In a thirteenth aspect of the present invention based on the ninth aspect, a content identification information inputting step of inputting content identification information for identifying the content stored in the server is further provided, and the multiplexing step further multiplexes the content identification information onto the television signal.

According to the thirteenth aspect, the television signal includes the content identification information, and the television receiver that has received the television signal obtains the content by using the received content identification information and generates the browser screen based on the obtained content. Thus, the sender of the television signal is allowed to change freely the browser screen displayed on the television receiver.

In this case, a display instruction inputting step of inputting a display instruction that causes the television receiver to display the content may be further provided, and the multiplexing step may further multiplex the display instruction onto the television signal. Thus, the television signal includes the display instruction, whereby the television receiver that has received the television signal can start a WWW browser process immediately after receipt of the browser display instruction. Thus, the sender of the television signal is allowed to control the timing for displaying the browser screen on the television screen, thereby enabling the browser screen to be displayed with ease in synchronization with the television broadcast.

BRIEF DESCRIPTION OF THE DRAWINGS

FIG. 11 is an exemplary illustration showing a screen, at the time of display of reserved substance, of the television receiver according to the second embodiment of the present invention;

BEST MODE FOR CARRYING OUT THE INVENTION (First Embodiment)
In FIG. 1, the television broadcasting device 1 includes a multiplexing section 11 and a transmitting section 12. The television receiver 2 includes a television screen generating section 20, a screen combining section 30, a monitor 40, a microcomputer 51, a memory 60, a browser display instruction obtaining section 71, a URL obtaining section 72, a display style information obtaining section 73, a remote controller 80, and a modem 90.

Figure 1:
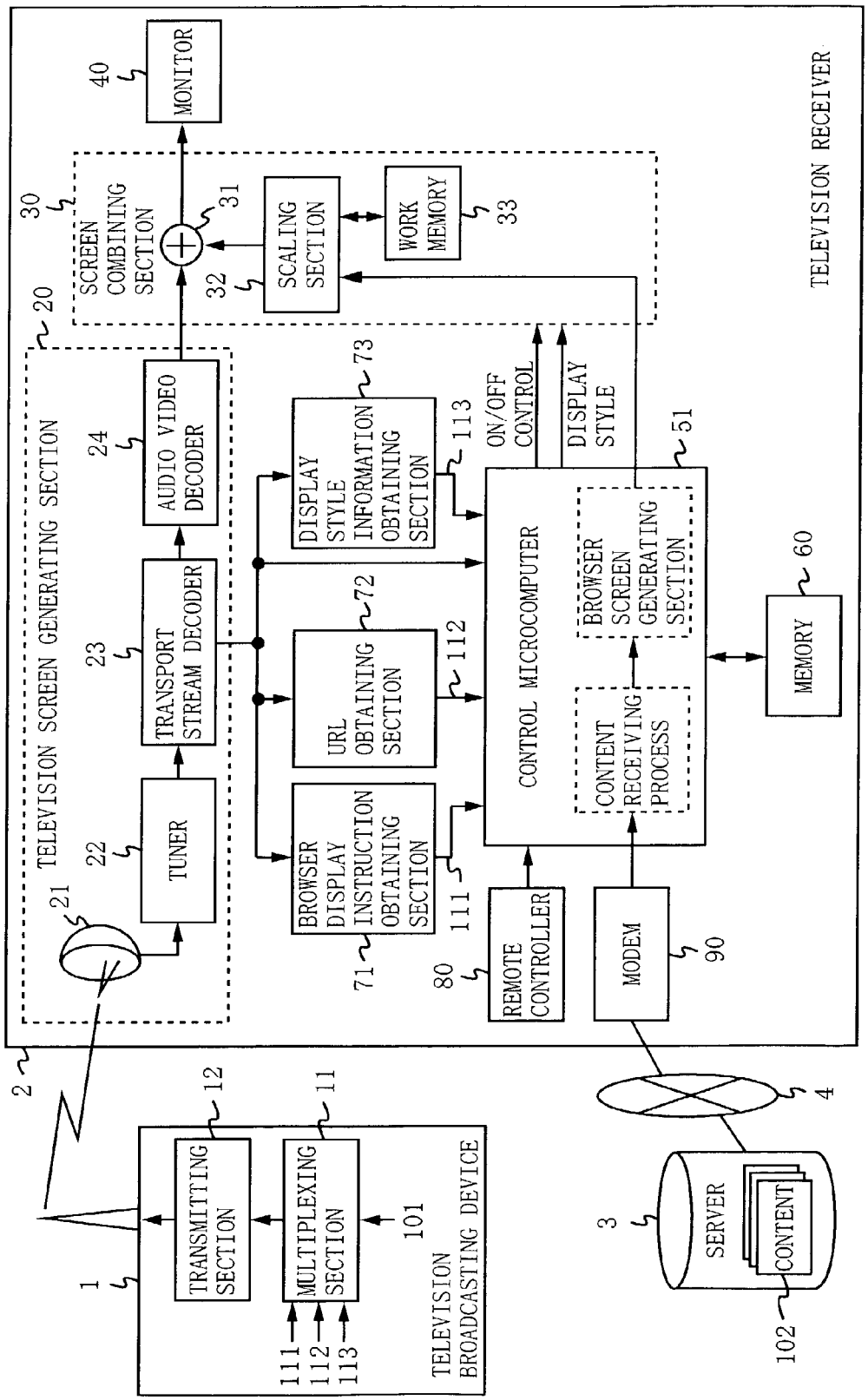
FIG. 1 is a block diagram illustrating the structure of a television broadcasting device and a television receiver according to a first embodiment of the present invention.

The television receiver 2 is connected to the Internet 4. A server 3 storing various contents 102 is connected to the Internet 4. The television receiver 2 has a function of receiving a television broadcasting signal transmitted from the television broadcasting device 1 and a function (WWW browser function) of displaying, on a screen, a content 102 stored in the server 3 connected via the Internet 4. Note that only one server 3 is shown in FIG. 1 for sake of simplification of the drawing, but in practice a great number of servers are actually connected to the Internet 4.

The television broadcasting device 1 operates as follows. The multiplexing section 11 multiplexes, onto an inputted television signal 101, browser control data (a browser display instruction 111, a URL 112, and display style information 113) for controlling the WWW browser function of the television receiver 2. The transmitting section 12 transmits the television signal outputted from the multiplexing section 11 to the television receiver 2.

The television receiver 2 generally operates as follows. The television screen generating section 20 receives the television broadcasting signal transmitted from the television broadcasting device 1, and generates a television screen based on the received television broadcasting signal. When the browser display instruction 111 is received, the microcomputer 51 activates a WWW browser. At this time, the microcomputer 51 receives, from the server 3, the content 102 corresponding to the obtained URL 112 and generates a browser screen based thereon. The screen combining section 30 receives the obtained display style information 113 from the microcomputer 51. Based on the display style information 113, the screen combining section 30 combines the browser screen with the television screen. As a result, a screen (for example, FIG. 2) obtained by combining the browser screen with the television screen is displayed on the monitor 40.

As such, the television broadcasting device 1 transmits the television signal containing the browser control data, and the television receiver 2 displays the browser screen in a combined form with the television screen based on the browser control data. In particular, the television receiver 2 displays the browser screen in a combined form based on the display style information 113 multiplexed in the television broadcasting device 1. Thus, it is possible to display the browser screen in a combined form with the television screen in accordance with a display style designated by a broadcaster of the television signal.

Next, each component of the television receiver 2 is described. The television screen generating section 20 includes an antenna 21, a tuner 22, a transport stream decoder (hereinafter referred to as a TS decoder for short) 23, and an audio video decoder (hereinafter referred to as an AV decoder for short) 24. The antenna 21 receives radio waves of a digital television broadcast transmitted from the television broadcasting device 1, and converts the received waves into electrical signals for output. The tuner 22 selects any signal spanning a predetermined frequency band from among the signals outputted from the antenna 21, and demodulates the selected signal. Thus, the tuner 22 outputs a transport stream that complies with MPEG (Moving Picture Experts Group) standards.

According to the MPEG standards, the TS decoder 23 performs a filtering process on the transport stream outputted from the tuner 22. This filtering process is performed, as is already known, by using such as a program identifier (Program ID) included in a PAT (Program Association Table) packet or a PMT (Program Map Table) packet, or the like. This process separates the transport stream into the following streams: an audio stream, a video stream, and a control stream containing, for example, a packet related to data broadcasting or the aforementioned browser control data. The audio stream and the video stream are provided to the AV decoder 24, and the control stream is provided to the microcomputer 51.

The AV decoder 24 decodes the audio stream and the video stream, which have been outputted from the TS decoder 23, for outputting an audio signal and a video signal, respectively. The video signal obtained by the AV decoder 24 is provided to the screen combining section 30.

The screen combining section 30 includes a combining circuit 31, a scaling section 32, and a work memory 33. The browser screen generated as a result of the WWW browser process being performed by the microcomputer 51 is inputted to the scaling section 32. The scaling section 32 performs, in accordance with a control by the microcomputer 51, a scaling process for changing (enlarging or reducing) the size of the browser screen and a pixel conversion process for converting the format of the screen. The work memory 33 is a work memory for the scaling section 32. The browser screen resized by the scaling section 32 is provided to the combining circuit 31.

In accordance with the control by the microcomputer 51, the combining circuit 31 combines the resized browser screen outputted from the scaling section 32 with the television screen outputted from the television screen generating section 20. An output signal from the combining circuit 31 is provided to the monitor 40. As a result, a screen obtained by combining the browser screen with the television screen as a window is displayed on the monitor 40.

The microcomputer 51 performs various processes carried out in the television receiver 2. The memory 60 is a work memory for the microcomputer 51, and memorizes a program executed by the microcomputer 51 and various data. The microcomputer 51 executes the program memorized in the memory 60 for performing various processes as described above. These processes include, for example, a content receiving process, a browser screen generating process, an operation input accepting process, and a display control process, or the like, which will be described further below (see FIG. 4).

The browser display instruction obtaining section 71, the URL obtaining section 72, and the display style information obtaining section 73 are filtering circuits for extracting the browser control data from the control stream outputted from the TS decoder 23 to the microcomputer 51. The browser control data according to the present embodiment contains the browser display instruction 111, the URL 112, and the display style information 113. The browser display instruction 111 instructs the television receiver 2 to activate the WWW browser and display the browser screen in a combined form with the television screen. The URL 112 is a URL of the content 112 to be displayed in a combined form with the television screen. The display style information 113 is information about a display style of the browser screen, which is used when the television receiver 2 combines the browser screen with the television screen. These three pieces of data are all determined by the sender of the television signal, of which the display style information 113 will be described in detail further below.

The browser display instruction obtaining section 71 extracts the browser display instruction 111 from the control stream. The URL obtaining section 72 extracts the URL 112 from the control stream. The display style information obtaining section 73 extracts the display style information 113 from the control stream. These three pieces of browser control data extracted by the filtering circuits are all supplied to the microcomputer 51.

The remote controller 80 is an inputting device operated by a user (viewer) of the television receiver 2. The viewer uses the remote controller 80 for inputting various commands into the television receiver 2. Note that the inputting device provided to the television receiver 2 is not restricted to the remote controller 80, and that an arbitrary inputting device operated by the viewer may be used. For example, in the case where the television receiver is a personal computer having a function of receiving a television broadcast, a mouse or a keyboard can be used as the inputting device.

The modem 90 is connected to a communications line provided by a communications company. The modem 90 has a function of transmitting data to the communications line and a function of receiving data therefrom. The type of the modem 90 may be arbitrary, as long as the modem has a function of modulating and demodulating a signal in accordance with a modulation method of the communications line. For example, the modem 90 may be a modem connected to a telephone line, an ADSL modem, or an FTTH ONU (Fiber To The Home Optical Network Unit) connected to a fiber-optic network.

Next, the WWW browser function of the television receiver 2 is described. The microcomputer 51 executes WWW browser software for performing the WWW browser process. The WWW browser process at least includes the content receiving process and the browser screen generating process. Note that the WWW browser software executed by the microcomputer 51 may be any software offered commercially or dedicated to the television receiver 2.

The content receiving process included in the WWW browser process is a process for receiving the content 102 from the server 3 connected to the Internet 4. In the content receiving process, the microcomputer 51 performs a process for controlling the modem 90 and a communications protocol process such as TCP/IP (Transmission Control Protocol/Internet Protocol) for receiving the content 102 stored in the server 3. The received content is stored in the memory 60.

Note that the server 3 may be referred to as a WWW server or a Web server and that the content 102 may be referred to as a Web content or a Web page. The content 102 contains various data files such as an HTML (HyperText Markup Language) file, an image file, and a text file. The content 102 is identified by using a URL containing a server name and a file name. The URL is assigned to each content 102 and corresponds to content identification information.

The browser screen generating process included in the WWW browser process is a process for generating the browser screen based on the received content. In the browser screen generating process, the microcomputer 51 first decodes the image file, the text file or the like, contained in the received content, in accordance with the characteristics of each file. The decoded result is written into the memory 60. Then, the microcomputer 51 refers to the HTML file contained in the received content for obtaining a value of each pixel composing the browser screen based on the above-described decoded result. The browser screen is generated by performing these two processes. The generated browser screen is provided to the screen combining section 30 and memorized in the display plane (not shown) managed by the screen combining section 30.

Note that, in the WWW browser process, a content containing a moving image as well as a content containing a still image may be decoded for generating a browser screen including the moving image. Such a function of playing the content containing the moving image is referred to as a streaming play function.

Figure 2:
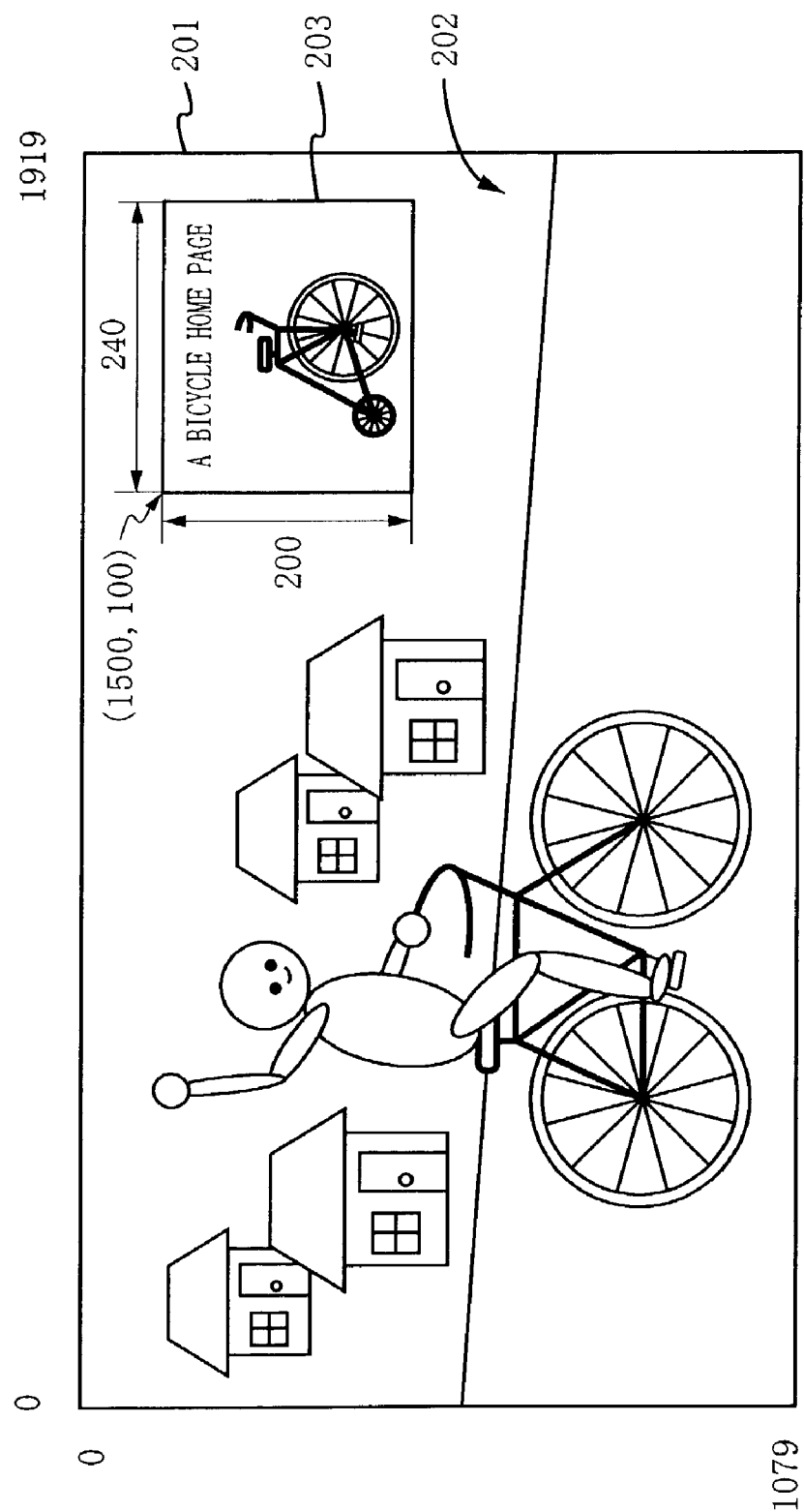
FIG. 2 is an exemplary illustration showing a display screen of the television receiver according to the first embodiment of the present invention.

Next, with reference to FIG. 2, the display style information 113 is described in detail. FIG. 2 is an exemplary illustration showing a display screen displayed by the television receiver 2. A display screen 201 shown in FIG. 2 is obtained by combining a browser screen 203 generated as a result of the WWW browser process performed by the microcomputer 51 with a television screen 202, and displayed on the monitor 40. The browser screen 203 is reduced and displayed in a combined form in the upper-right corner of the display screen 201.

In FIG. 2, it is assumed that the size of the display screen 201 is 1920 pixels in a horizontal direction and 1080 pixels in a vertical direction, and that the size of the browser screen 203 is 240 pixels in a horizontal direction and 200 pixels in a vertical direction. Furthermore, if a two-dimensional coordinate system is set so that its origin lies at the upper-left vertex of the display screen 201, the browser screen 203 is assumed to be placed so that the upper-left vertex thereof lies at a distance of 1500 pixels in a rightward direction and 100 pixels in a downward direction away from the coordinate origin.

In order to obtain the display screen 201 by combining the browser screen 203 with the television screen 202, it is required to determine where the browser screen 203 is to be placed on the television screen 202. Considering that the shape of the browser screen 203 is rectangular, it is required to determine what type of rectangular area into which the browser screen 203 is to be fitted for combining. In order to represent the above-described rectangular area, the following two approaches can be taken: an approach using a position of one vertex of the rectangle and lengths of two sides thereof (hereinafter referred to as a first approach), and an approach using positions of two vertices (those lying on the different sides) of the rectangle (hereinafter referred to as a second approach). If the above-described first approach is used, the display style information 113 of the browser screen 203 contains coordinates (1500, 100) of the upper-left vertex of the rectangular area onto which the browser screen 203 is to be placed, and lengths of the two sides, 240 and 200, of the rectangular area. If the above-described second approach is used, the display style information 113 of the browser screen 203 contains coordinates (1500, 100) of the upper-left vertex and coordinates (1740, 300) of the lower-right vertex of the rectangular area.

Figure 3:
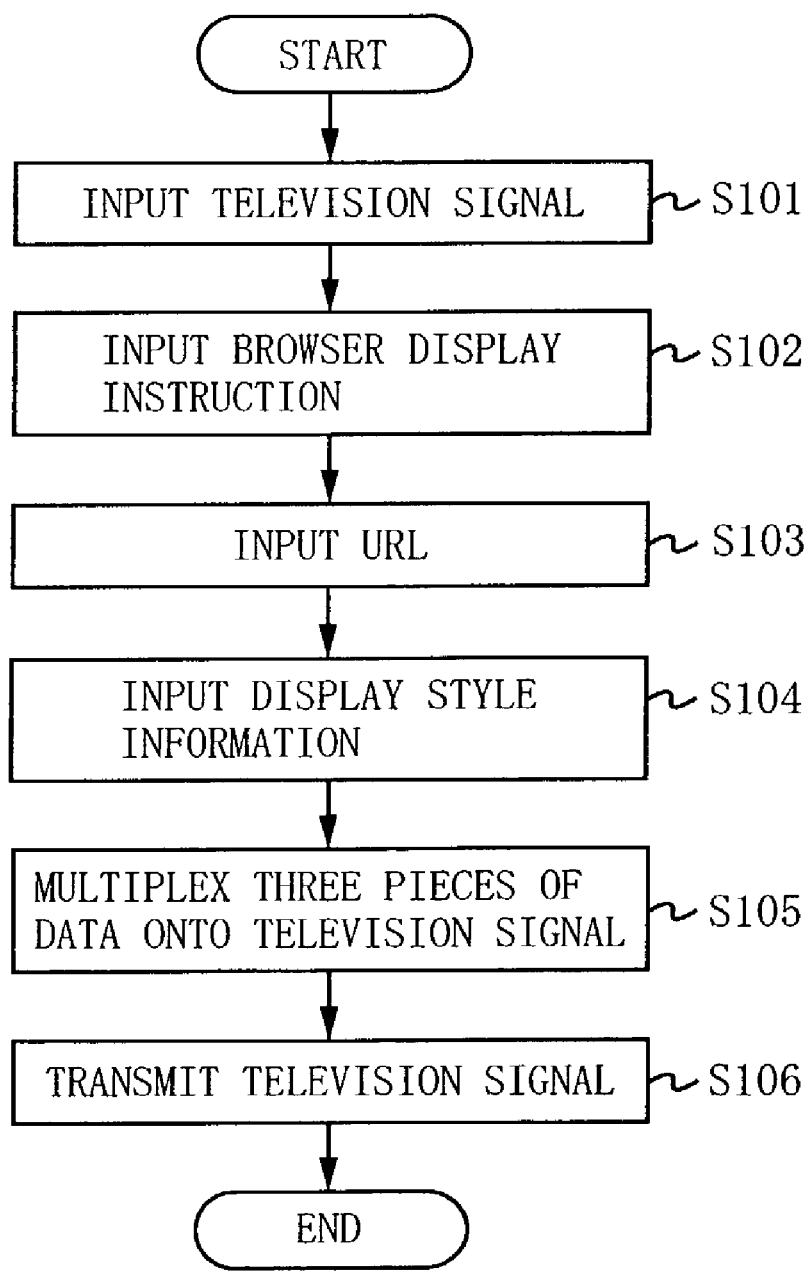
FIG. 3 is a flowchart illustrating an operation of the television broadcasting device according to the first embodiment of the present invention.

Next, with reference to FIG. 3, an operation of the television broadcasting device 1 is described. FIG. 3 is a flowchart illustrating the operation of the television broadcasting device 1. In the television broadcasting device 1, the television signal 101 is first inputted into the multiplexing section 11 (step S101). The television signal 101 inputted at step S101 is the transport stream obtained by multiplexing the audio signal and the video signal composing a television program. Then, the browser control data for controlling the WWW browser function of the television receiver 2 is inputted into the multiplexing section 11 (steps S102 to S104). More specifically, the browser display instruction 111 is inputted at step S102, the URL 112 is inputted at step S103, and the display style information 113 is inputted at step S104 into the multiplexing section 11.

Next, the multiplexing section 11 multiplexes three types of browser control data inputted at steps S102 to S104 onto the television signal 101 inputted at step S101 (step S105). The television signal obtained at step S105 is provided to the transmitting section 12. The transmitting section 12 transmits the television signal containing the three types of browser data to the television receiver 2 (step S106). More specifically, the transmitting section 12 modulates a predetermined carrier wave based on the television signal outputted from the multiplexing section 11, and transmits the modulated carrier wave in the form of an electric wave.

Note that the browser control data may be multiplexed at step S105 onto the transport stream in an arbitrary manner. For example, the browser display instruction 111 can be multiplexed by being described in a script description language such as ECMA (European Computer Manufacturers Association) Script. Furthermore, in addition to the approach using the script description language for multiplexing, the URL 112 can be multiplexed as an identifier of program arrangement information such as EIT (Event Information Table) or SDT (Service Description Table). Still further, in addition to the approach using the script description language for multiplexing or the approach for multiplexing as the identifier of the program arrangement information, the display style information 113 can be multiplexed as a style sheet such as CSS (Cascading Style Sheet) used in data broadcasting.

The browser control data is obtained as follows. For example, take the case where a television program producer desires the viewer to access a content related to an advertised item appearing on the television screen. In this case, after the television program has been produced, it is checked whether the advertised item appears on each television screen composing the television program or not. Then, it is determined where the browser screen is to be displayed in a combined form with the television screen. In doing this, the position of the browser screen is determined, based on the structure of the television screen, so as not to deface the original television screen. For example, if the television program is a commercial message, the position of the browser screen is determined, based on the position of the advertised item appearing on the television screen, so as not to overlap on the advertised item.

Note that the advertised item may be tangible goods (for example, a home appliance, a passenger vehicle, foods, and cosmetics) or intangible services (for example, banking, travel agency, carrier, and telecommunications industry). A business enterprise (for example, a home appliance manufacturer, an auto manufacturer, a bank, and a travel agency) providing these advertised items administers the server 3 connected to the Internet 4. In the server 3, a content introducing the advertised item or a content of the business enterprise providing the advertised item, or the like, are stored.

Figure 4:
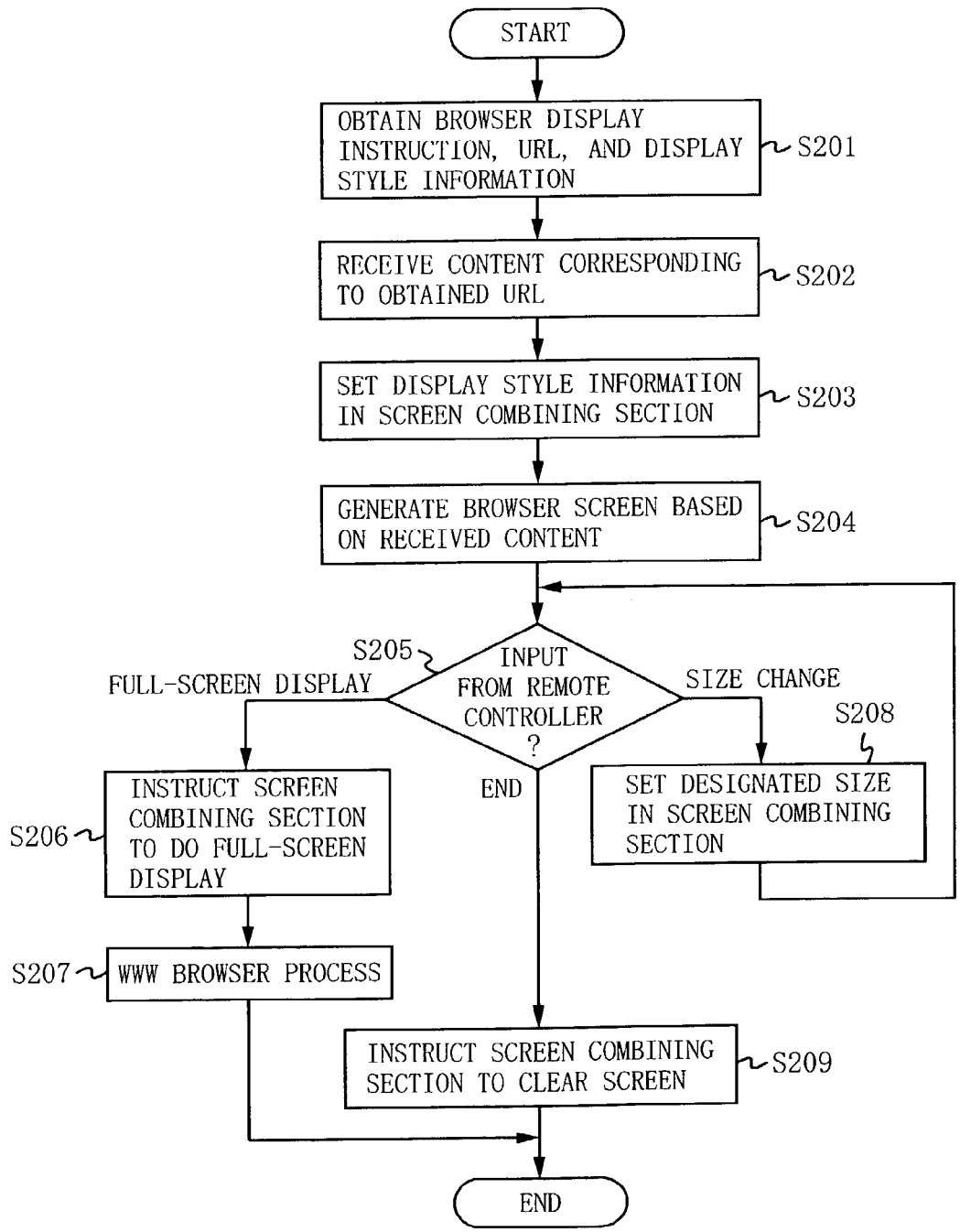
FIG. 4 is a flowchart illustrating an operation of the television receiver according to the first embodiment of the present invention.

Next, with reference to FIG. 4, an operation of the television receiver 2 is described. Hereinafter, a case is taken as an example where a commercial message for a product a manufactured and distributed by a company A is broadcast on television. It is assumed that the company A administers the server 3 connected to the Internet 4, and that the content 102 introducing the product a has been stored in the server 3. A producer of the commercial message desires the viewer to access the content 102 when the commercial message for the product a is broadcast. Therefore, when the television broadcast changes into the commercial message for the product a, the television broadcasting device 1 multiplexes the browser display instruction 111, the URL 112, and the display style information 113 onto the inputted television signal 101 for transmission. FIG. 4 is a flowchart illustrating an operation of the microcomputer 51 after the television receiver 2 receives the television signal onto which these three types of browser control data have been multiplexed.

The browser display instruction obtaining section 71 extracts the browser display instruction 111 from the control stream outputted from the TS decoder 23 for outputting to the microcomputer 51. Similarly, the URL obtaining section 72 and the display style information obtaining section 73 extract the URL 112 and the display style information 113, respectively, from the control stream for outputting to the microcomputer 51. The microcomputer 51 first obtains the browser display instruction 111, the URL 112, and the display style information 113 (step S201). When the browser display instruction 111 is received, the microcomputer 51 recognizes that it is an instruction to activate the WWW browser, and performs processing at step S202 or later.

Next, the microcomputer 51 receives the content 102 corresponding to the URL 112 obtained at step S201 (step S202). More specifically, the microcomputer 51 starts executing the WWW browser software immediately after receipt of the browser display instruction 111 for controlling the modem 90, and performs the predetermined communications protocol process such as TCP/IP. The microcomputer 51 accesses the server 3 specified by the host name of the URL 112 obtained at step S201, and receives the content 102 specified by the file name of the URL 112 from the server 3. The content received at step S202 is memorized in the memory 60.

Next, the microcomputer 51 sets, in the screen combining section 30, the display style information 113 obtained at step S201 (step S203). In the display style information 113, information about the rectangular area placed where the browser screen is to be combined with the television screen is contained. After step S203 has been performed, the screen combining section 30 combines the browser screen with the television screen based on the information about the rectangular area. That is, the screen combining section 30 changes the size of the browser screen in order to fit into the rectangular area, and then combines the resized browser screen with the television screen.

Next, the microcomputer 51 generates the browser screen based on the content received at step S202 (step S204). More specifically, the microcomputer 51 executes the WWW browser software for decoding the image file, the text file, or the like, contained in the received content according to the characteristics of each file, and then writes the decoded result into the memory 60. Then, the microcomputer 51 refers to the HTML file contained in the received content for obtaining the value of each pixel composing the browser screen based on the above-described decoded result. The browser screen generated at step S204 is provided to the screen combining section 30.

Hereupon, the browser screen generated based on the content 102 is displayed on the monitor 40, whereby the viewer recognizes the presence of the content 102 related to the product a. If the viewer becomes interested in the product a, he/she uses the remote controller 80 to input a full-screen display command into the television receiver 2. Furthermore, if the viewer desires to check the substance of the content 102, he/she uses the remote controller 80 to input a size change command into the television receiver 2. Still further, if the viewer does not become interested in the product a, he/she uses the remote controller 80 to input an end command into the television receiver 2.

After checking the input from the remote controller 80, the microcomputer 51 proceeds to step S206 if the full-screen display command is inputted, proceeds to step S208 if the size change command is inputted, and proceeds to step S209 if the end command is inputted (step S205). Note that, in order to input the size change command, the remote controller 80 may be provided with a zoom key for giving instructions to enlarge the browser screen to a predetermined size. Alternatively, the remote controller 80 may be provided with a function of giving instructions to change the size of a box cursor displayed on the screen, and a decision key for selecting the size of the box cursor after it has been changed into a desired size.

If the full-screen display command is inputted, the microcomputer 51 instructs the screen combining section 30 to do a full-screen display in order to cause the received content to be displayed in a full-screen (step S206). Then, the microcomputer 51 performs the WWW browser process (step S207). While the control of the microcomputer 51 remains at step S207, the viewer is allowed to use the television receiver 2 as the WWW browser. If the browser end command is inputted while performing the WWW browser process, the microcomputer 51 ends the WWW browser process, and thereby ends the process for the browser display instruction 111.

If the size change command is inputted, in order to adjust the size of the browser screen to the size designated by the viewer, the microcomputer 51 sets the size designated by the size change command in the screen combining section 30 (step S208). After step S208 has been performed, the screen combining section 30 adjusts the size of the browser screen to the designated size, and then combines the resized browser screen with the television screen. After step S208, the microcomputer 51 proceeds to step S205.

If the end command is inputted, the microcomputer 51 instructs the screen combining section 30 to clear the screen in order to clear the browser screen (step S209). After step S209 has been performed, the screen combining section 30 outputs the television screen generated by the television screen generating section 20. After step S209, the microcomputer 51 ends the process for the browser display instruction 111 without performing the WWW browser process.

Note that the television broadcasting device 1 may multiplex, as the browser control data, a browser display end instruction giving instructions to end the browser function onto the inputted television signal 101. In this case, the television receiver 2 is further provided with a browser display end instruction obtaining section for extracting the browser display end instruction from the control stream outputted from the TS decoder 23. If the browser display end instruction is obtained from the browser display end instruction obtaining section before receiving an input from the remote controller 80 at step S205, the microcomputer 51 proceeds to step S209 as in the case where the end command is inputted from the remote controller 80.

As described above, in the present embodiment, the television broadcasting device transmits the television signal containing the browser control data, and the television receiver displays the browser screen in a combined form with the television screen in accordance with the browser control data. In particular, the television receiver displays the browser screen in a combined form in accordance with the display style information multiplexed in the television broadcasting device. Thus, it is possible to display the browser screen in a combined form with the television screen in accordance with the display style designated by the broadcaster of the television signal.

Furthermore, the television receiver starts the WWW browser process immediately after receipt of the browser display instruction. Thus, it is possible to display the browser screen with ease in synchronization with the television broadcast.

Still further, the display style of the browser screen is determined by the broadcaster of the television signal, thereby enabling the display style of the browser screen to be determined with ease based on the structure of the television screen. Therefore, it is possible to determine the display style of the browser screen with ease so as not to deface a main part of the television screen. For example, it is possible to determine the display style of the browser screen so that the advertised item is not hidden under the browser screen when the commercial message is broadcast.

Figure 5:
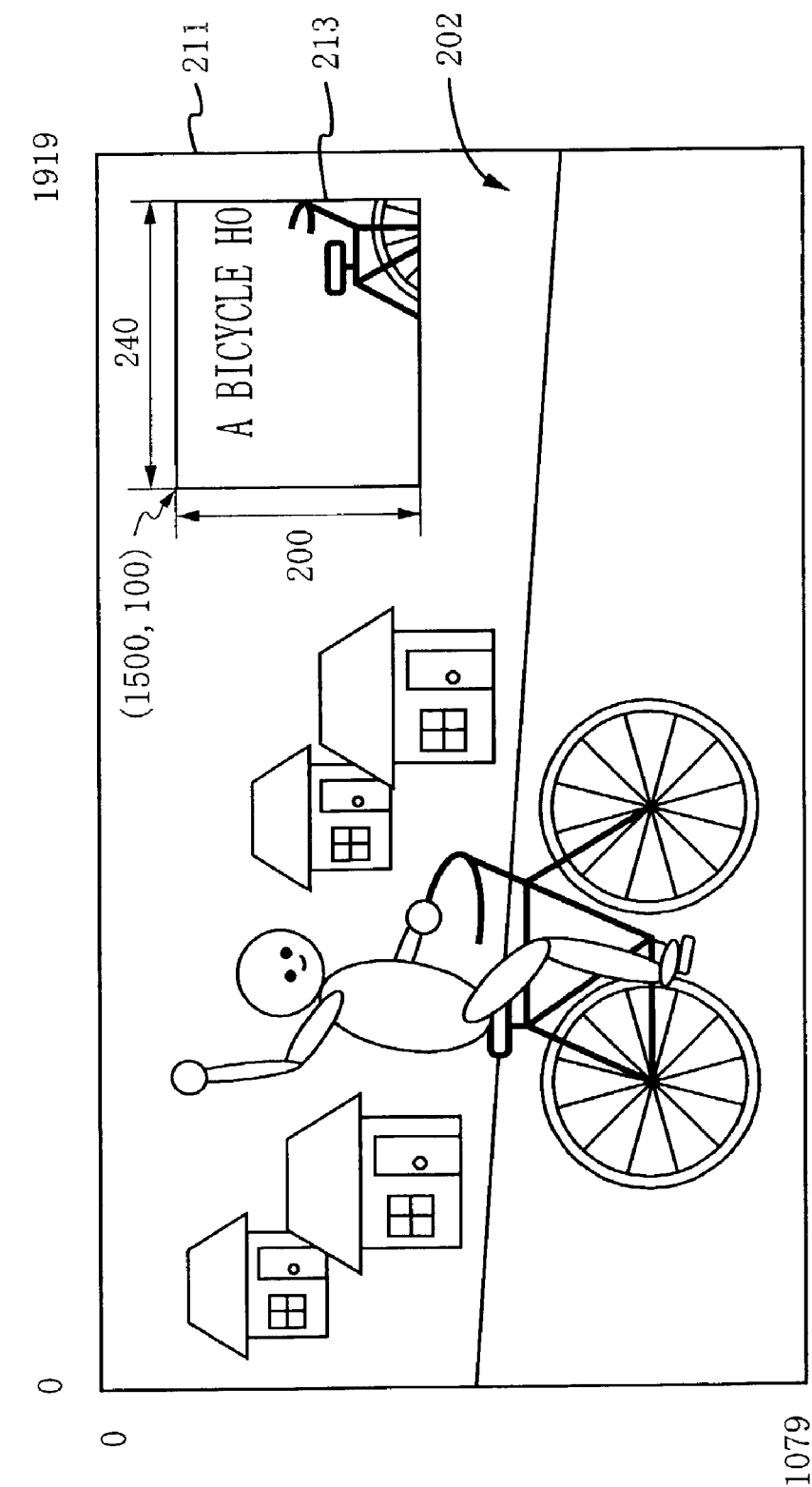
FIG. 5 is an exemplary illustration showing a display screen of the television receiver according to a first variant of the first embodiment of the present invention.

In the present embodiment, the resized browser screen is assumed to be combined with the television screen. However, the browser screen may be combined with the television screen without performing a size change. FIG. 5 is an exemplary illustration showing a display screen of the television receiver according to a first variant of the present embodiment. A display screen 211 shown in FIG. 5 is obtained by combining the browser screen 213 with the original television screen 202 without performing a size change. In the display screen 211, only a part of the original browser screen is displayed.

Figure 6:
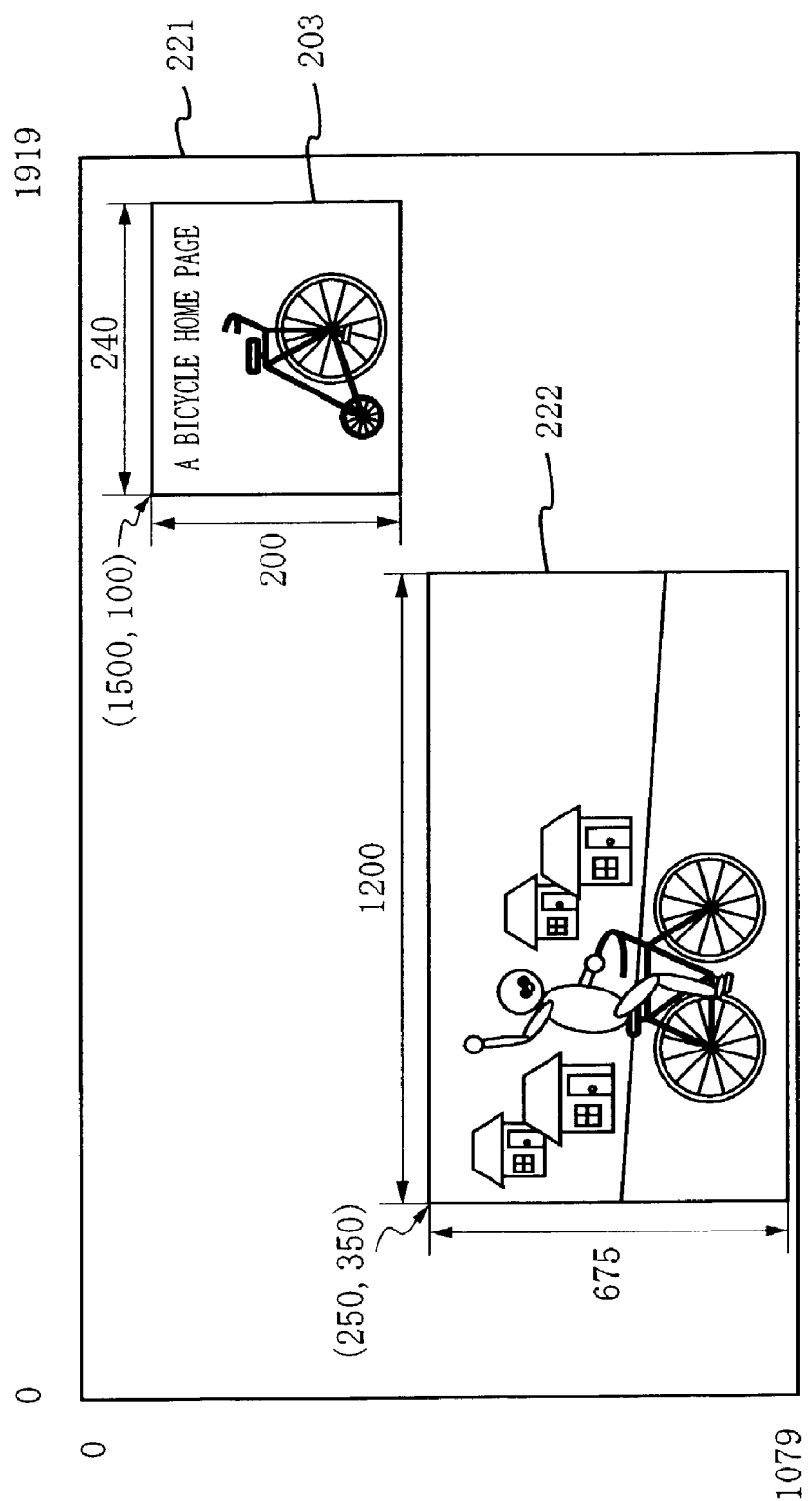
FIG. 6 is an exemplary illustration showing a display screen of the television receiver according to a second variant of the first embodiment of the present invention.

Furthermore, in the present embodiment, it is assumed that the browser screen is combined in a position where a part of the television screen is to be covered without changing the size of the television screen. However, the television screen may be reduced so as not to overlap on the browser screen for obtaining the display screen based on the reduced television screen and the resized browser screen. FIG. 6 is an exemplary illustration showing a display screen of the television receiver according to a second variant of the present embodiment. A display screen 221 shown in FIG. 6 is obtained by arranging a reduced television screen 222 and the resized browser screen 203 so as not to overlap each other.

The television screen generating section 20 generates a television screen having the same size as the monitor 40 (in FIG. 6, 1920 pixels in a horizontal direction and 1080 pixels in a vertical direction). The microcomputer 51 obtains the size and position of the reduced television screen 222 based on the size and position of the browser screen 203. In doing this, the microcomputer 51 obtains an area occupied by the browser screen 203 on the display screen 221, thereby obtaining the size and position of the reduced television screen 222 so as not to overlap on the area. Furthermore, the microcomputer 51 may obtain the size and position of the reduced television screen 222 so as not to change a horizontal to vertical ratio (aspect ratio) of the screen. In the example shown in FIG. 6, the reduced television screen 222 is reduced by five eighths, both longitudinally and transversely, from the original television screen.

The microcomputer 51 sets the obtained position and size in the screen combining section 30. The screen combining section 30 reduces, in accordance with the size and position set by the microcomputer 51, the television screen generated by the television screen generating section 20. In addition to this, the screen combining section 30 combines, in accordance with the display style (size and position) of the browser screen 203 set by the microcomputer 51, the browser screen 203 with the television screen. The above-described process allows the television receiver 2 to obtain the display screen 221 based on the television screen generated by the television screen generating section 20.

Furthermore, in the second variant, by including, in the display style information 103, a reduction permission information indicating whether reduction of the television screen is permitted or not, the television broadcasting device 1 may multiplex the display style information 103 containing the reduction permission information onto the inputted television signal 101. In this case, under the control of the microcomputer 51, the television receiver 2 may display the display screen 221 shown in FIG. 6 if the reduction permission information indicates permission, or display the display screen 201 shown in FIG. 2 if the reduction permission information indicates non-permission.

(Second Embodiment)

Figure 7:
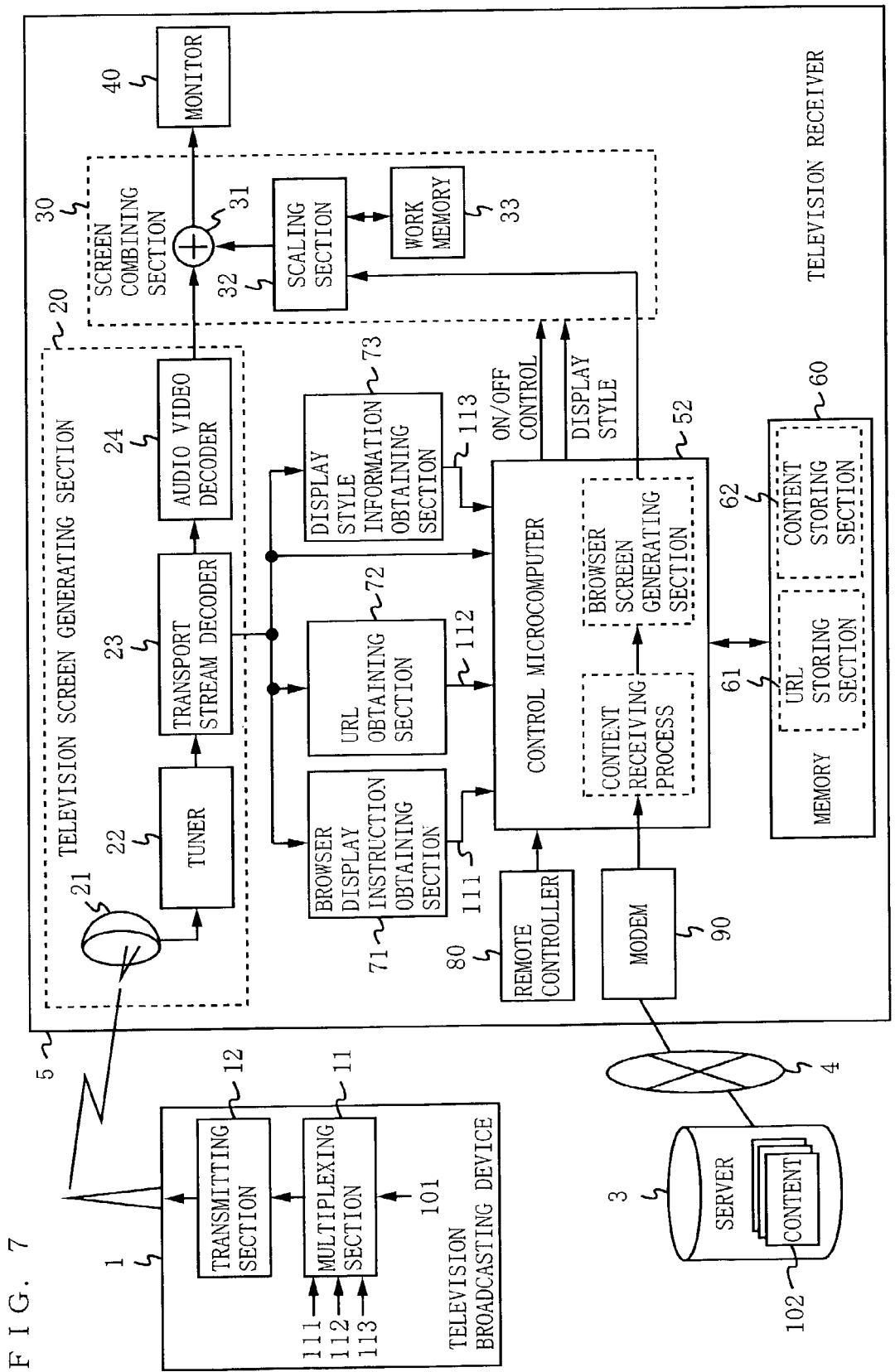
FIG. 7 is a block diagram illustrating the structure of a television broadcasting device and a television receiver according to a second embodiment of the present invention.

FIG. 7 is a block diagram illustrating the structure of a television receiver according to a second embodiment of the present invention. A television receiver 5 shown in FIG. 7 is obtained by adding a content viewing reservation function to the television receiver 2 according to the first embodiment. Thus, a function of storing any obtained URL and any received content is added to the television receiver 5. As a result, a new process is added to the processes performed by a microcomputer 52. The above-described content viewing reservation function may be referred to as bookmarking in a WWW browser function of a personal computer. Any components of the present embodiment that function in similar manner to their counterparts in the first embodiment are denoted by like numerals, with the descriptions thereof omitted.

The memory 60 according to the present embodiment includes a URL storing section 61 and a content storing section 62. The URL storing section 61 stores, in accordance with the control by the microcomputer 52, any URL received by the URL obtaining section 72. The content storing section 62 stores, in accordance with the control by the microcomputer 52, any received content 102 received by the microcomputer 52 by performing the content receiving process. The content 102 includes various data such as an HTML file, an image file, and a text file, which is required for generating a browser screen.

Figure 8:
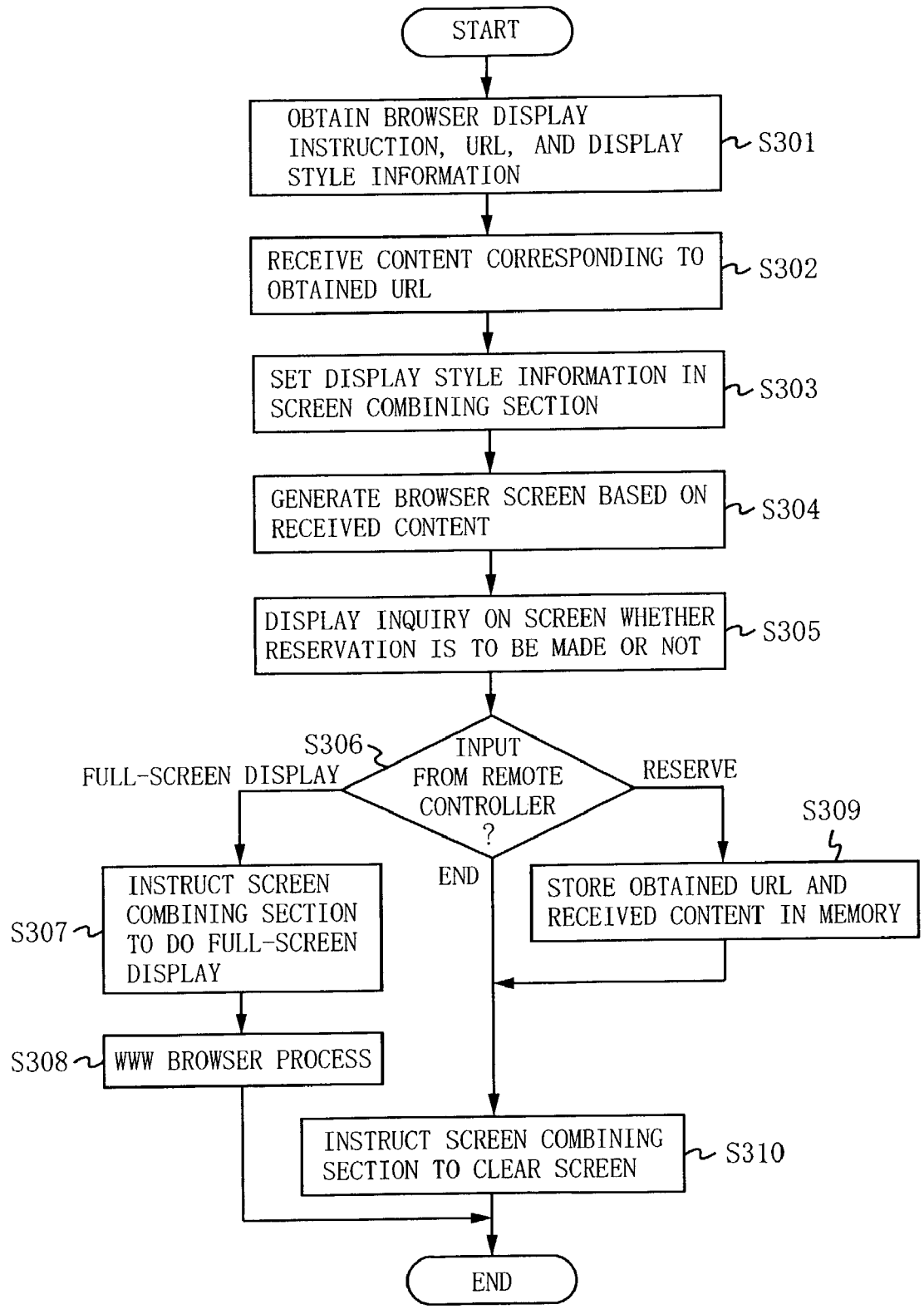
FIG. 8 is a flowchart illustrating an operation, at the time of receipt of a television broadcast, of the television receiver according to the second embodiment of the present invention.
Figure 9:
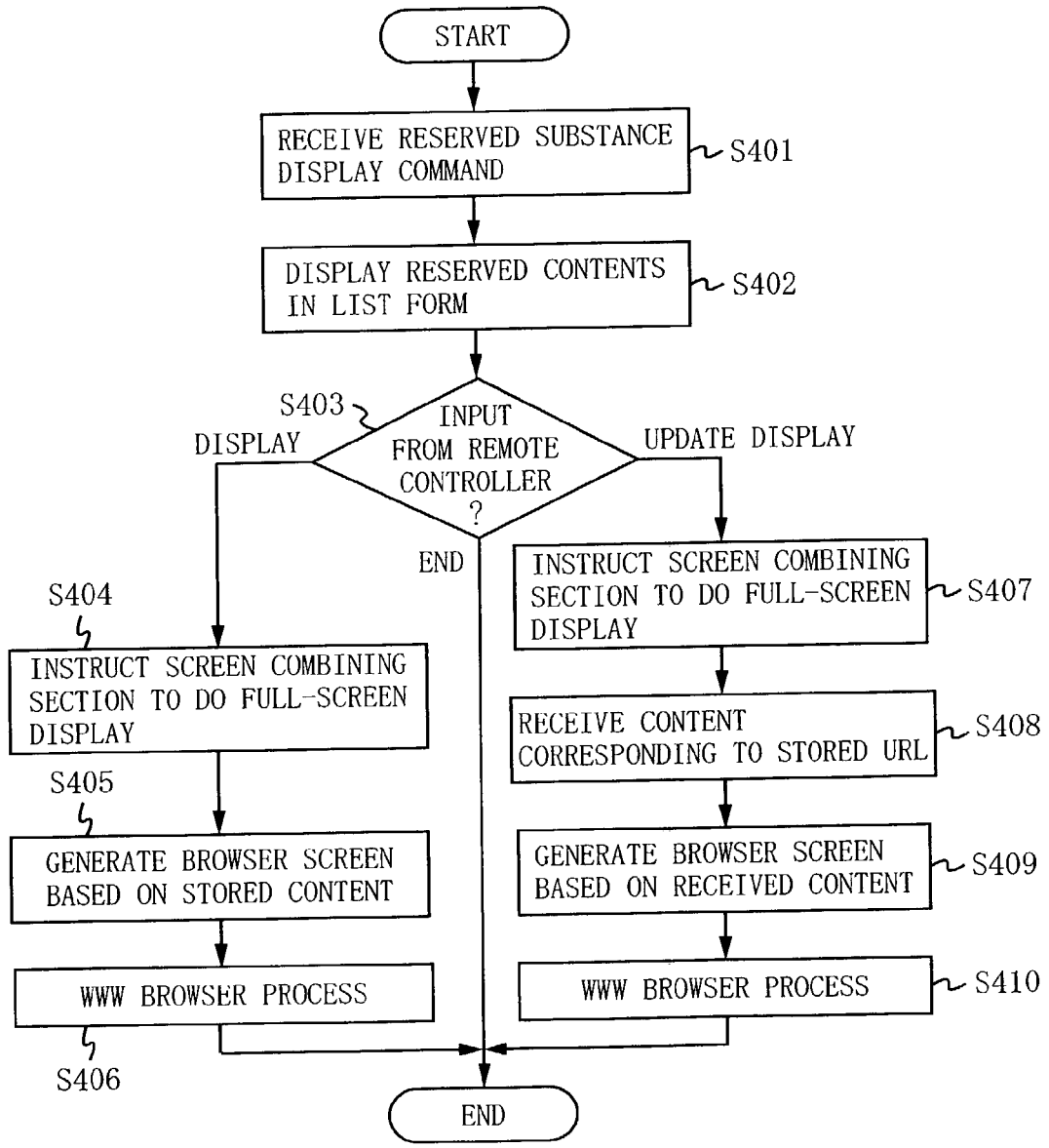
FIG. 9 is a flowchart illustrating an operation, at the time of play of a reserved content, of the television receiver according to the second embodiment of the present invention.

The microcomputer 52 operates differently in receiving a television broadcast and in playing a reserved content. FIG. 8 is a flowchart illustrating an operation of the microcomputer 52 when the television broadcast is received. FIG. 9 is a flowchart illustrating an operation of the microcomputer 52 when the reserved content is played.

The flowchart shown in FIG. 8 is obtained by adding a process of step S305 to the flowchart (FIG. 4) according to the first embodiment, and by replacing a process of step S208 with a process of step S309. Among the steps shown in FIG. 8, the descriptions of the same steps as those shown in FIG. 4 are omitted.

Figure 10:
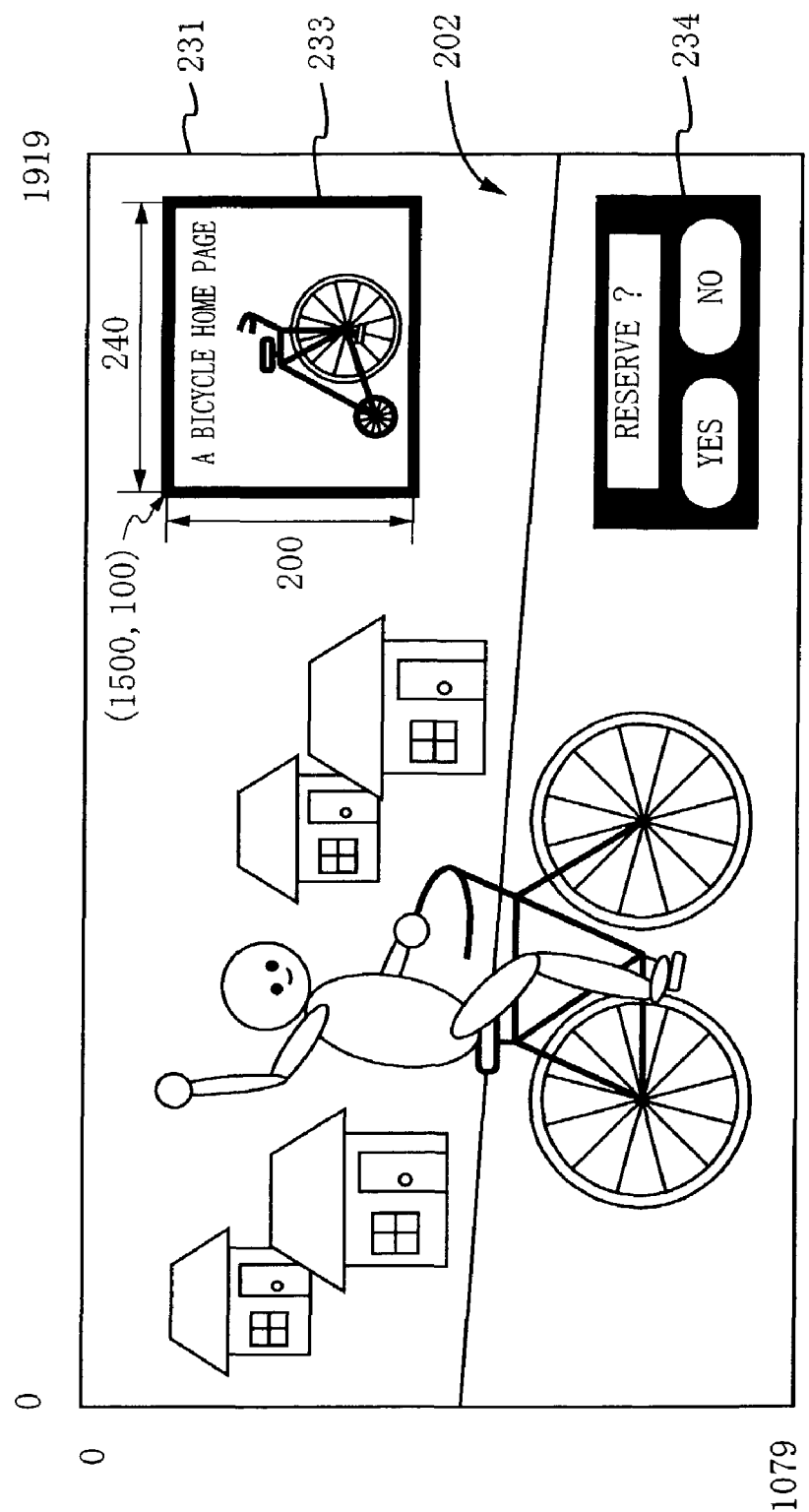
FIG. 10 is an exemplary illustration showing a display screen, at the time of content reservation, of the television receiver according to the second embodiment of the present invention.
Figure 12:
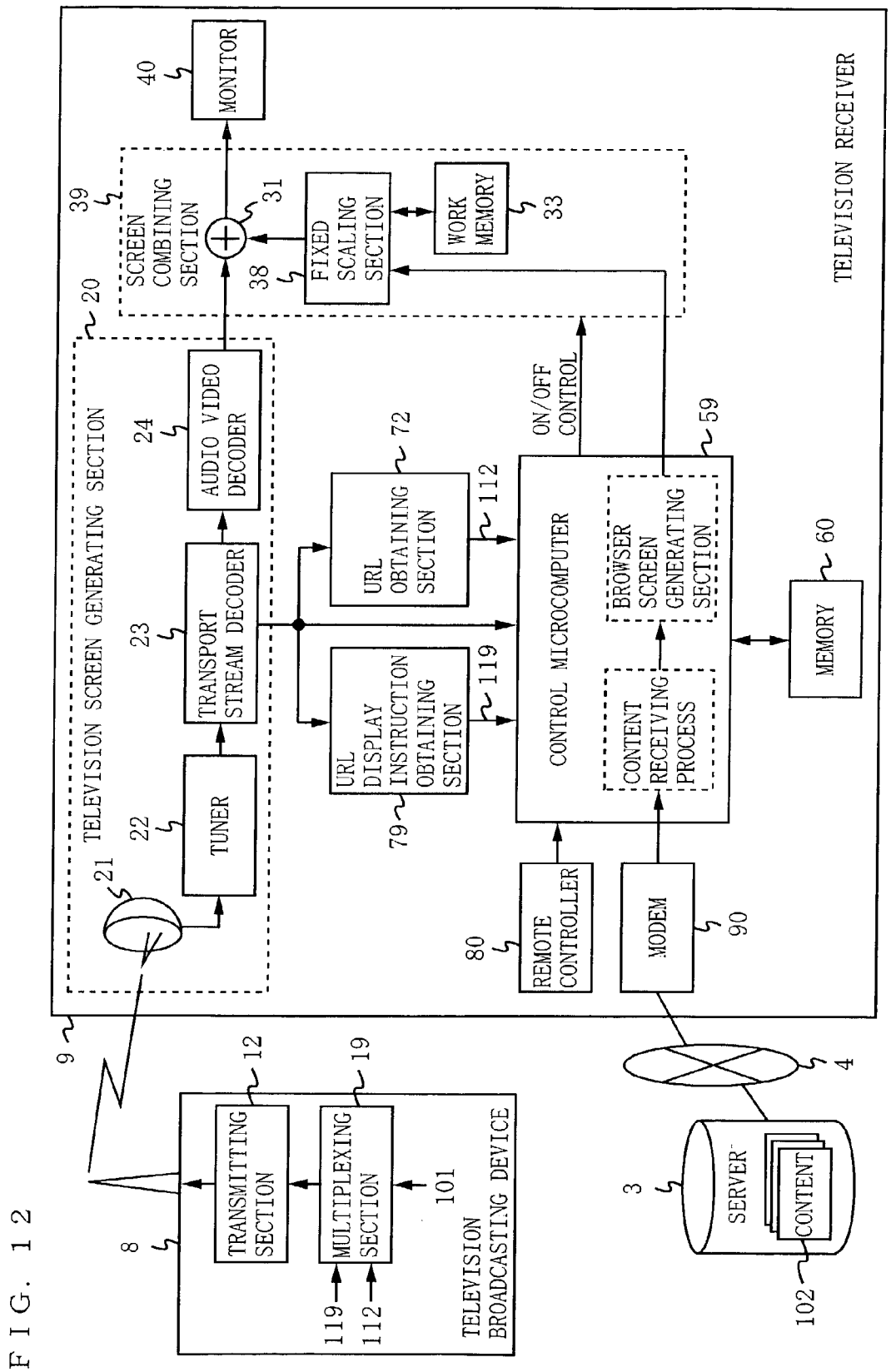
FIG. 12 is a block diagram illustrating the structure of a conventional television broadcasting device and a conventional television receiver.
Figure 13:
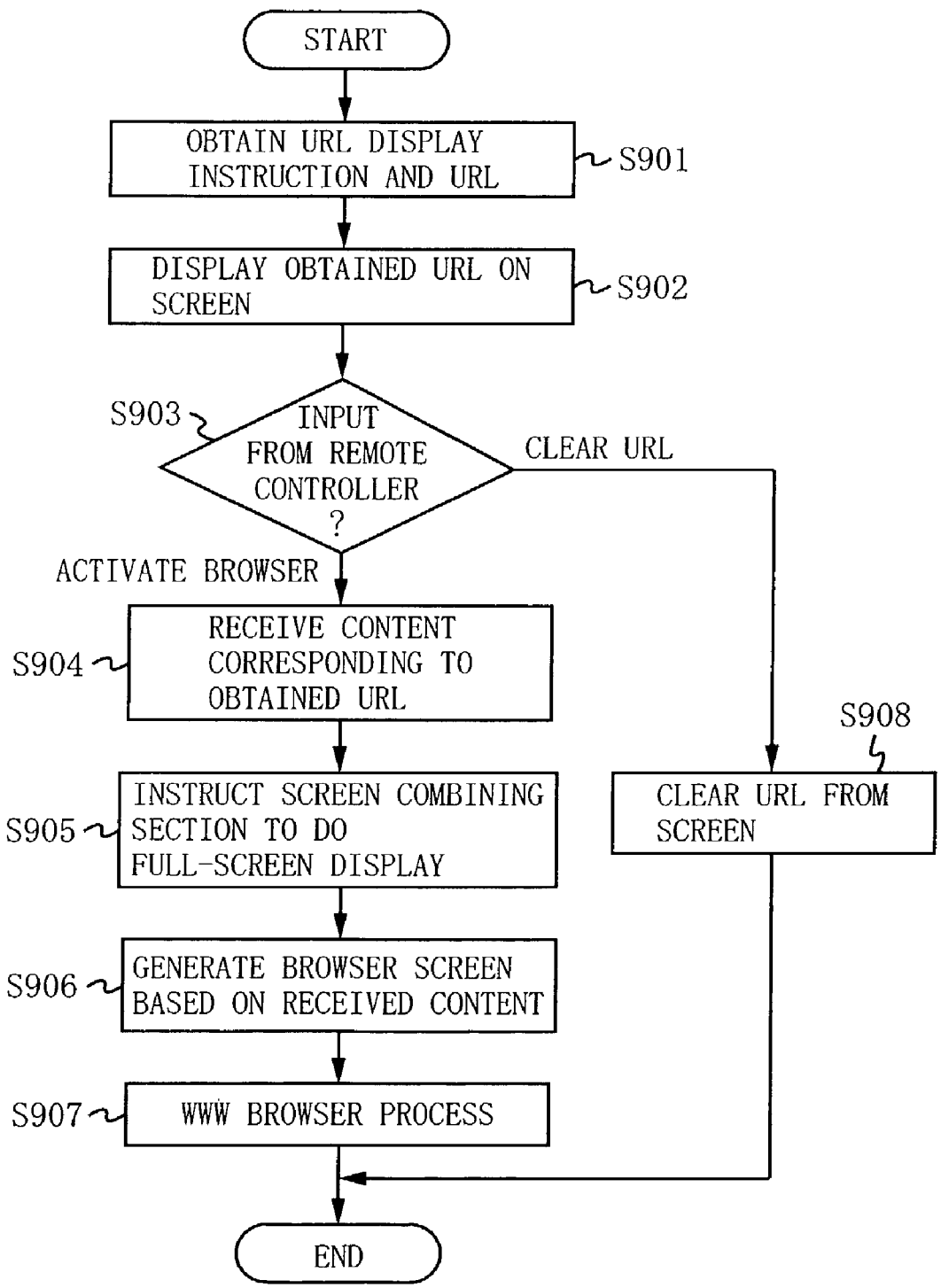
FIG. 13 is a flowchart illustrating an operation of the conventional television receiver.

The microcomputer 52 generates the browser screen at step S304, and performs OSD control for displaying, on the screen, an inquiry whether a reservation is to be made or not (step S305). FIG. 10 is an exemplary illustration showing a display screen after the microcomputer 52 has performed step S305. A display screen 231 shown in FIG. 10 is obtained by combining a browser screen 233 with the original television screen 202, and then combining an inquiry screen 234 therewith. The frame of the browser screen 233 is displayed in a highlighted form for enabling a viewer to recognize that this screen is a screen to be reserved. The inquiry screen 234 includes a button (in FIG. 10, "YES") to be selected when the reservation is to be made and a button (in FIG. 10, "NO") to be selected when the reservation is not to be made. If the viewer uses the remote controller 80 to select either button, the selected button is displayed in a highlighted form. For example, in FIG. 10, the button to be selected when the reservation is to be made is selected and displayed in a highlighted form. By operating the remote controller 80 after seeing the inquiry screen 234, it is possible for the viewer to select whether the content is to be reserved or not.

Next, the microcomputer 52 checks an input from the remote controller 80, and proceeds to step S309 if a reserve command is inputted (step S306). In this case, the microcomputer 52 writes the URL 112 obtained by the URL obtaining section 72 into the URL storing section 61 of the memory 60, and writes the content received at step S301 into the content storing section 62 of the memory 60 (step S309). As a result, the obtained URL and the received content are stored in the memory 60 with a correspondence therebetween being kept. After performing step S309, the microcomputer 52 proceeds to step S310 for instructing the screen combining section 30 to clear the screen as in the case where the end command is inputted (step S310). Note that if either the full-screen display command or the end command is inputted at step S306, the microcomputer 52 performs the same process as that performed in the first embodiment.

Note that, in the present embodiment, the television broadcasting device 1 may multiplex, as browser control data, a browser display end instruction to give instructions to end the browser function onto the inputted television signal 101. In this case, the television receiver 5 is further provided a browser display end instruction obtaining section for extracting the browser display end instruction from a control stream outputted from the TS decoder 23. If the browser display end instruction is obtained from the browser display end instruction obtaining section before receiving an input from the remote controller 80 at step S306, the microcomputer 52 proceeds to step S310 as in the case where the end command is inputted from the remote controller 80.

The viewer reserves the content by inputting the reserve command while a commercial message is being broadcast, and then watches a television program. When the television program has ended, the viewer uses the remote controller 80 to input a reserved substance display command into the television receiver 5. With reference to FIG. 9, described below is an operation of the microcomputer 52 when the reserved substance display command is inputted.

The microcomputer 52 first receives the reserved substance display command inputted from the remote controller 80 (step S401). Next, the microcomputer 52 displays any reserved contents in list form (step S402). FIG. 11 is an exemplary illustration showing a listing display screen for displaying a plurality of reserved contents. The listing display screen 301 shown in FIG. 11 can display up to 6 browser screens at the same time. The listing display screen 301 shows that three types of contents each provided by A bicycle manufacturer, B bank, and C travel agency have already been reserved, and that these contents have been stored in the television receiver 2. The microcomputer 52 generates a browser screen based on each content, and reduces each of the browser screens for generating the listing display screen 301. Note that the listing display screen 301 is assumed to be generated by a process performed by the microcomputer 52, but that a part of the process may be performed by, for example, a scaling section 32 of the screen combining section 30.

When any one of the reserved contents is to be displayed, the viewer uses the remote controller 80 for selecting the content to be displayed. On the listing display screen 301, the frame of the selected content to be displayed is displayed in a highlighted form. In the listing display screen 301 shown in FIG. 11, a homepage of A bicycle manufacturer is selected and displayed in a highlighted form. As such, the viewer uses the remote controller 80 to select the content to be displayed.

Next, the microcomputer 52 checks an input from the remote controller 80, and proceeds to step S404 if a display command is inputted, proceeds to step S407 if an update display command is inputted, and ends the process if an end command is inputted (step S403).

If the display command is inputted, the microcomputer 52 instructs the screen combining section 30 to do a full-screen display in order to display the browser screen in a full-screen (step S404). Next, the microcomputer 52 generates the browser screen based on the content stored in the content storing section 62 at step S309 (step S405). Next, the microcomputer 52 performs a WWW browser process (step S406). If a browser end command is inputted while the WWW browser process is being performed, the microcomputer 52 ends the WWW browser process, and thereby ends the process for the display command.

If the update display command (also referred to as a reload command) is inputted, the microcomputer 52 instructs the screen combining section 30 to do the full-screen display in order to display the browser screen in a full-screen (step S407). Next, the microcomputer 52 receives the content 102 corresponding to the URL stored in the URL storing section 61 at step S309 (step S408). The received content is stored in the memory 60. Then, the microcomputer 52 generates the browser screen based on the content received at step S408 (step S409). Next, the microcomputer 52 performs the WWW browser process (step S410). If the browser end command is inputted while the WWW browser process is being performed, the microcomputer 52 ends the WWW browser process, and thereby ends the process for the update display command.

Note that the viewer may use the remote controller 80, in any one of steps S406 and S410, for giving instructions to refer a link displayed on the browser screen. If the viewer gives such instructions, the microcomputer 52 obtains a URL to be accessed by interpreting link information stored in the content storing section 62, and receives a content corresponding to the obtained URL. Then, the microcomputer 52 outputs, to the screen combining section 30, the browser screen generated based on the received content.

As described above, the television receiver according to the present embodiment stores URLs and contents in the memory when the reserve command is inputted, and performs the WWW browser process by using the stored URLs and contents when the display command is inputted. By storing contents in such a manner, it is possible to display any reserved contents in list form and display the reserved contents without reaccessing the server. Furthermore, by storing URLs in such a manner, it is possible to reaccess any previously accessed content without obtaining the URL again. Thus, the television receiver according to the present embodiment is provided with greater convenience than the television receiver according to the first embodiment.

Note that, in the television receivers according to the first and second embodiments, it is assumed that the browser screen that has been generated based on the content related to the advertised item is displayed in a combined form with the television screen while the commercial message is being broadcast, but that the same process may be performed while a general television program or data broadcasting is being broadcast. For example, if a soccer game is being broadcast on television, a browser screen showing the team's win-loss standings or each player's profile may be displayed in a combined form with the television screen. From such a browser screen, it is possible to achieve the same effect as the commercial message by setting a display style by a broadcaster of a television signal.

Furthermore, in the first and second embodiments, the television receiver is assumed to be provided with the monitor 40 as a display section. However, instead of being provided with the display section, the television receiver may be structured so as to be connected to a display section settled externally. Still further, it is assumed that the microcomputers 51 and 52 provide the generated browser screen to the screen combining section 30. Instead of doing this, the browser screen may be recorded temporarily in the memory 60 and then provided to the screen combining section 30. Furthermore, the screen combining section 30 is assumed to change the size of the browser screen. Instead of doing this, the microcomputer 51 may execute predetermined software for changing the size of the browser screen, and then provide the resized browser screen to the screen combining section 30.

Furthermore, it is assumed that the browser display instruction obtaining section 71, the URL obtaining section 72, and the display style information obtaining section 73 are each structured by the filtering circuit. Instead of this, the control stream outputted from the TS decoder 23 may be written into the memory 60 so that the microcomputers 51 and 52 execute predetermined software in order to extract the browser control data.

Furthermore, the display style information is assumed to at least include the information about the rectangular area into which the browser screen is fitted when it is combined with the television screen. In addition to this, the display style information may include transparency used in combining the browser screen with the television screen or a cycle used in displaying and clearing the browser screen on the television screen at regular intervals.

Still further, a type or characteristics of the communications line used for accessing the Internet may be arbitrary. Also, communications protocol used by the microcomputers 51 and 52 may be arbitrary. Furthermore, the television broadcast is assumed to be received with the antenna 21. Instead of this, the television broadcast may be received via a high-bandwidth network. In this case, the television broadcast may be received by using the same network as a network for accessing the Internet. Alternatively, the television broadcast may be received by using a different network.

Industrial Applicability

As described above, the television receiver according to the present invention can display the browser screen in a combined form with the television screen in accordance with the display style designated by the broadcaster of the television signal, whereby the television receiver is applicable to various devices having a television broadcast receiving function. Furthermore, the information providing method according to the present invention can be applied to, for example, a television broadcasting device that transmits the television signal.

The invention claimed is:

1. A television receiver that receives a television broadcast, comprising:
television screen generating means for receiving a television signal and generating a television program screen based on the received television signal;
content receiving means for receiving a content related to a commercial product appearing on the television program screen from a server connected via a communications network;
browser screen generating means for generating, based on the content received by the content receiving means, a browser screen that provides information about the commercial product appearing on the television program screen;
display style information obtaining means for obtaining, from the television signal, display style information that determines a display style of the browser screen that provides information about the commercial product;
screen combining means for combining, in accordance with the display style information obtained by the display style information obtaining means, the browser screen that provides information about the commercial product with the television program screen on which an image of the commercial product has appeared, without changing a size of the television program screen; and
display instruction obtaining means for obtaining, from the television signal, a content display instruction determined by a program producer of the television broadcast,
wherein the display style information is determined by the program producer of the television broadcast, and includes: information about a position on the television program screen of the browser screen that provides information about the commercial product; and information about a rectangular area, for allowing the image of the commercial product appearing on the television program screen to be displayed without being obscured by the browser screen that provides information about the commercial product,
wherein the screen combining means combines the browser screen that provides information about the commercial product and whose size has been changed to fit the rectangular area with the television program screen, and
wherein the content receiving means and the browser screen generating means operate when the display instruction obtaining means obtains the content display instruction.

2. The television receiver according to claim 1, wherein the display style information includes, as information about the rectangular area, a position of one vertex of the rectangular area and lengths of two sides of the rectangular area on the television program screen.

3. The television receiver according to claim 1, wherein the display style information includes, as information about the rectangular area, positions of two vertices of the rectangular area on the television program screen.

4. The television receiver according to claim 1, wherein the browser screen is a screen for advertising the commercial product appearing on the television program screen.

5. The television receiver according to claim 1, further comprising content identification information obtaining means for obtaining, from the television signal, content identification information for identifying a content stored in the server,
wherein the content receiving means receives a content corresponding to the content identification information obtained by the content identification information obtaining means.

6. The television receiver according to claim 1, further comprising inputting means operated by a user, wherein the screen combining means changes a size of the browser screen when a size change command is inputted from the inputting means.

7. the television receiver according to claim 1, further comprising:
inputting means operated by a user; and
content storing means for storing the content received by the content receiving means when a reserve command is inputted from the inputting means,
wherein when a reproduction display command is inputted from the inputting means, the browser screen generating means generates the browser screen based on the content stored in the content storing means.

8. The television receiver according to claim 7, further comprising:
content identification information obtaining means for obtaining, from the television signal, content identification information for identifying the content stored in the server; and
content identification information storing means for storing the content identification information obtained by the content identification information obtaining means,
wherein when an update display command is inputted from the inputting means, the content receiving means receives, from the server, a content specified by the update display command by using the content identification information stored in the content identification information storing means.

9. The television receiver according to claim 7, wherein when a reserved content display command is inputted from the inputting means, the browser screen generating means generates a content listing screen based on the content stored in the content storing means.

10. The television receiver according to claim 7, wherein when a refer link command is inputted from the inputting means, the content receiving means receives a content specified by the refer link command, based on contents stored in the content storing means.

11. The television receiver according to claim 1, further comprising a display section for displaying a screen created by the screen combining means.

12. An information providing method for providing information to a television receiver,
the information providing method being executed when a content related to a commercial product appearing on a television program screen has been stored in a server connected to a communications network, the information providing method comprising:
a television signal inputting step of inputting a television signal corresponding to the television program screen;
a display style information inputting step of inputting display style information that determines a display style of a browser screen that provides information about a commercial product, the display style indicating that a browser screen, which is generated based on the content and which provides information about a commercial product appearing on the television program screen, is combined with the television program screen on which an image of the commercial product has appeared, without changing a size of the television program screen;
a display instruction inputting step of inputting a display instruction that causes the television receiver to display the content determined by a program producer of a television broadcast;
a multiplexing step of multiplexing the display style information and the display instruction onto the television signal; and
a television signal transmitting step of transmitting, to the television receiver, the television signal onto which the display style information has been multiplexed,
wherein the display style information is determined by the program producer of the television broadcast, and includes: information about a position on the television program screen of the browser screen that provides information about the commercial product; and information about a rectangular area, for allowing the image of the commercial product appearing on the television program screen to be displayed without being obscured by the browser screen that provides information about the commercial product.

13. The information providing method according to claim 12, wherein the browser screen is a screen for advertising the commercial product appearing on the television program screen.

14. The information providing method according to claim 12, further comprising:
a content identification information inputting step of inputting content identification information for identifying the content stored in the server,
wherein the multiplexing step further multiplexes the content identification information onto the television signal.

* * * * *